US012643464B2

(12) United States Patent
Mueckl

(10) Patent No.: US 12,643,464 B2
(45) Date of Patent: Jun. 2, 2026

(54) CONTROL OF A VEHICLE-MOUNTED LIGHTING SYSTEM

(71) Applicant: MILWAUKEE ELECTRIC TOOL CORPORATION, Brookfield, WI (US)

(72) Inventor: Gareth J. Mueckl, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 95 days.

(21) Appl. No.: 18/423,558

(22) Filed: Jan. 26, 2024

(65) Prior Publication Data

US 2024/0253557 A1 Aug. 1, 2024

Related U.S. Application Data

(60) Provisional application No. 63/481,629, filed on Jan. 26, 2023.

(51) Int. Cl.
B60Q 1/24 (2006.01)
F02D 29/06 (2006.01)
(Continued)

(52) U.S. Cl.
CPC ............. B60Q 1/247 (2022.05); H02J 7/1446 (2013.01); H02J 7/42 (2026.01); H02J 7/865 (2026.01);
(Continued)

(58) Field of Classification Search
CPC ....... B60Q 1/247; F02D 29/06; F02D 31/001; F02D 2041/227; F21S 9/02; F21S 41/19;
(Continued)

(56) References Cited

U.S. PATENT DOCUMENTS 10,493,901 B2 12/2019 Schermerhorn et al.
10,790,766 B2 * 9/2020 Wolfe ................... E05F 15/611
(Continued)

FOREIGN PATENT DOCUMENTS

AU 2021106913 A4 * 11/2021 ............. F21V 25/00
KR 20220021618 A * 2/2022 ............. E02F 9/2091

OTHER PUBLICATIONS

Machine Translation of KR20220021618A (Year: 2022).*

*Primary Examiner* — Raymond R Chai
(74) *Attorney, Agent, or Firm* — Michael Best & Friedrich LLP

(57) ABSTRACT

A lighting system including a lighting device mountable to a vehicle is disclosed. The lighting system may include a lighting device including a lighting element configured to illuminate an area. A battery pack may be configured to provide power to the lighting device. A power supply interface may be configured to receive power from a power source of the vehicle and may be configured to provide power to the battery pack, the lighting device, or both the battery pack and the lighting device. The lighting system may include a second electronic processor that may be configured to receive, via the communication interface, onboard diagnostic information from a first electronic processor of the vehicle, and control, based on the onboard diagnostic information, an amount of power drawn by the power supply interface from the power source of the vehicle.

14 Claims, 3 Drawing Sheets

(51) Int. Cl.

| | |
|---|---|
| *F02D 31/00* | (2006.01) |
| *F21S 9/02* | (2006.01) |
| *F21S 41/19* | (2018.01) |
| *F21V 21/22* | (2006.01) |
| *F21W 107/10* | (2018.01) |
| *F21Y 105/16* | (2016.01) |
| *H02J 7/00* | (2026.01) |
| *H02J 7/14* | (2006.01) |
| *H02J 7/42* | (2026.01) |
| *H05B 47/115* | (2020.01) |

(52) U.S. Cl.

CPC ............ *H05B 47/115* (2020.01); *F02D 29/06* (2013.01); *F02D 31/001* (2013.01); *F21S 9/02* (2013.01); *F21S 41/19* (2018.01); *F21V 21/22* (2013.01); *F21W 2107/10* (2018.01); *F21Y 2105/16* (2016.08)

(58) Field of Classification Search

CPC . F21V 21/22; F21W 2107/10; F21Y 2105/16; H02J 7/00034; H02J 7/0068; H02J 7/1446; H05B 47/105; H05B 47/115; H05B 47/19

See application file for complete search history.

(56) References Cited

U.S. PATENT DOCUMENTS

| | | | | |
|---|---|---|---|---|
| 10,893,716 B2 * | 1/2021 | Kinney | .................... | B60Q 1/44 |
| 2015/0175055 A1 * | 6/2015 | Falb | ........................ | B60Q 1/115 |
| | | | | 701/49 |
| 2020/0340394 A1 * | 10/2020 | Jochman | .............. | F02B 63/044 |
| 2020/0351620 A1 | 11/2020 | Brotto et al. | | |
| 2021/0323422 A1 * | 10/2021 | Maiorana | ............... | B60L 53/16 |
| 2023/0123259 A1 * | 4/2023 | Avery | ................ | F21V 23/0471 |
| | | | | 362/431 |
| 2024/0406695 A1 * | 12/2024 | Macaluso | ............. | B60K 25/08 |

* cited by examiner

CONTROL OF A VEHICLE-MOUNTED LIGHTING SYSTEM

RELATED APPLICATIONS

This application claims priority to U.S. Provisional Application No. 63/481,629, filed Jan. 26, 2023, the entire contents of which are hereby incorporated by reference.

FIELD

The present invention relates to vehicle-mounted lighting systems and, specifically, to control of vehicle-mounted lighting systems.

SUMMARY

One example provides a lighting system including a lighting device mountable to a vehicle. The lighting device may include a lighting element configured to illuminate an area. A battery pack may be configured to provide power to the lighting device. A power supply interface may be configured to receive power from a power source of the vehicle and may be configured to provide power to the battery pack, the lighting device, or both the battery pack and the lighting device. A communication interface may be configured to communicate with a first electronic processor of the vehicle. The lighting system may include a second electronic processor that may be configured to receive, via the communication interface, onboard diagnostic information from the first electronic processor of the vehicle, and control, based on the onboard diagnostic information, an amount of power drawn by the power supply interface from the power source of the vehicle.

Another example provides a method of controlling a lighting system. The method may include receiving, with a power supply interface of the lighting system, power from a power source of a vehicle to which a lighting device of the lighting system is mounted. The lighting device may include a lighting element configured to illuminate an area. The method may also include providing, with the power supply interface, power to the lighting device, a battery pack of the lighting system, or both the lighting device and the battery pack. The battery pack may be configured to provide power to the lighting device. The method may also include receiving, with a second electronic processor of the lighting system via a communication interface of the lighting system, onboard diagnostic information from a first electronic processor of the vehicle. The method may also include controlling, with the second electronic processor and based on the onboard diagnostic information, an amount of power drawn by the power supply interface from the power source of the vehicle.

Another example provides a lighting system including a lighting device mountable to a vehicle. The lighting device may include a lighting element configured to illuminate an area. A battery pack may be configured to provide power to the lighting device. A power supply interface may be configured to receive power from a power source of the vehicle and may be configured to provide power to the battery pack, the lighting device, or both the battery pack and the lighting device. The lighting system may also include an electronic processor configured to determine an operational characteristic of the vehicle, and control, based on the operational characteristic, an amount of power drawn by the power supply interface from the power source of the vehicle.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
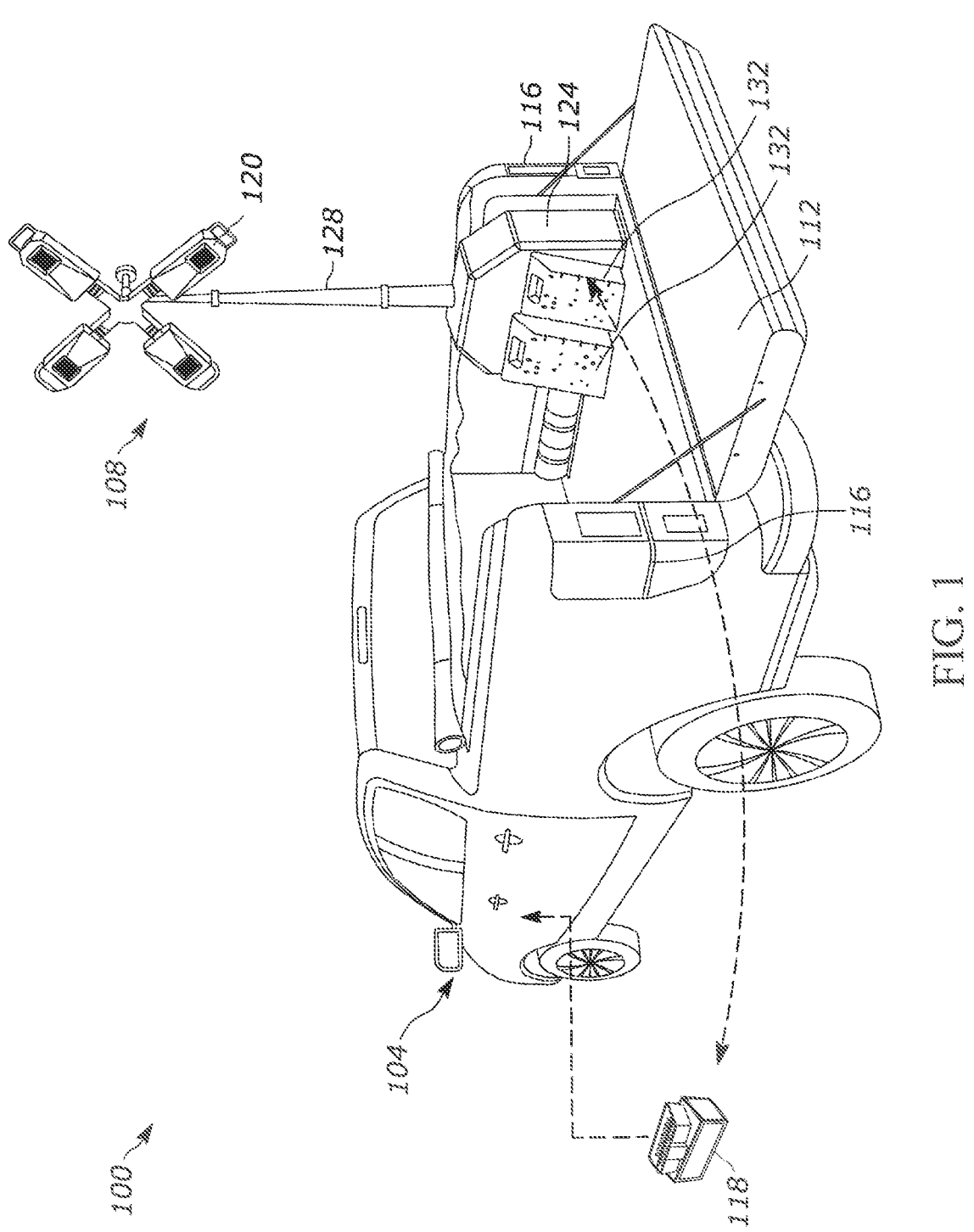
FIG. 1 illustrates a vehicle-mounted lighting system, according to some embodiments.

With reference to FIG. 1, a lighting system 100 includes a vehicle 104 and a lighting device 108 (i.e., mountable lighting device 108) mounted on the vehicle 104. The vehicle 104 may be any suitable vehicle onto which the lighting device 108 may be mounted. For example, in the illustrated embodiment, the vehicle 104 is truck including a bed 112 with the lighting device 108 mounted in the bed 112. The lighting device 108 may be mounted to or near a side wall of the bed 112 (e.g., a left side wall, a right side wall, or a front side wall) such that a large portion of the bed (e.g., over 50%, over 75%, over 90% or the like) is still available to be used. The vehicle 104 also includes a plurality of integrated lights 116, such as, for example, one or more headlights, one or more taillights, and other integrated lights commonly found on a vehicle. The lighting device 108 may be distinguishable from the integrated lights 116 because the lighting device 108 may be installed by a user/owner of the vehicle 104 after the vehicle has been manufactured and purchased as opposed to the integrated lights 116 that are installed during the manufacturing process of the vehicle 104.

In some instances, the lighting system 100 includes a communication interface 224 (see FIG. 2) configured to communicate with a first electronic processor 202 (see FIG. 2) of the vehicle 104. The communication interface 224 may allow the first electronic processor 202 of the vehicle 104 to bidirectionally communicate with a second electronic processor 216 (see FIG. 2) of the lighting device 108. The communication interface 224 may include and/or communicate with a removable communication device 118 (i.e., a wireless communication interface) coupled to the vehicle 104 for providing wireless communication (e.g., Bluetooth™ communication) bidirectionally between the vehicle 104 and the lighting device 108. The communication device 118 may be connected to an onboard diagnostic ("OBD") II port or a CAN bus port of the vehicle 104 for transmitting onboard diagnostic information to the lighting device 108.

The lighting device 108 is configured to be removably mounted on/in the vehicle 104, and includes one or more lighting elements 120, a base 124, and a mast 128 coupled between the base 124 and the lighting element 120. The base 124 supports the mast 128 and is configured to be removably mounted to the vehicle 104. For example, the base 124 may be secured to a side of the bed 112 as explained previously herein. The mast 128 supports the lighting element 120 in an upright/extended position. The mast 128 may be contractable/retractable such that the lighting device 108 may be compactly stored in the vehicle 104 when not in operation, for example, when the vehicle 104 is traveling. In some embodiments, the mast 128 includes a plurality of tubes which are telescopically received within each other, and which enable the height of the mast 128 to be adjusted. In some embodiments, the mast 128 may be folded into a storage position when the lighting device 108 is not in operation. The mast 128 and/or the lighting element 120 may be configured to rotate/pivot about one or more axes (e.g., around the mast axis, up, down, and/or the like) to allow light emitted by the lighting element 120 to be emitted in any one of multiple directions that is adjustable by a user.

The lighting element 120 may include plurality of light emitting elements (e.g., a plurality of LEDs) configured to illuminate an area outside of the vehicle 104 and/or inside the bed 112 of the vehicle 104. In some instances, the lighting device 108 is a site light configured to illuminate an area nearby the vehicle 104 that is not typically illuminated (or not typically illuminated with a great degree of brightness) by the integrated lights of the vehicle 104. For example, the lighting device 108 may be configured to illuminate a work area on one of the sides or a rear of the vehicle 104. The brightness of the lighting element 120, the number of LEDs illuminated, or a combination thereof may be adjusted to control the amount of illumination of the area outside of the vehicle 104. The lighting device 108 further includes a battery pack 132. In some embodiments, the lighting device 108 includes a plurality of battery packs 132. The battery pack 132 may be a removable battery pack electrically and physically connectable to the lighting device 108 for providing power to the lighting element 120. In some instances, the battery pack 132 may be electrically connectable to the vehicle 104 to receive charging power therefrom as explained in greater detail below.

Figure 2:
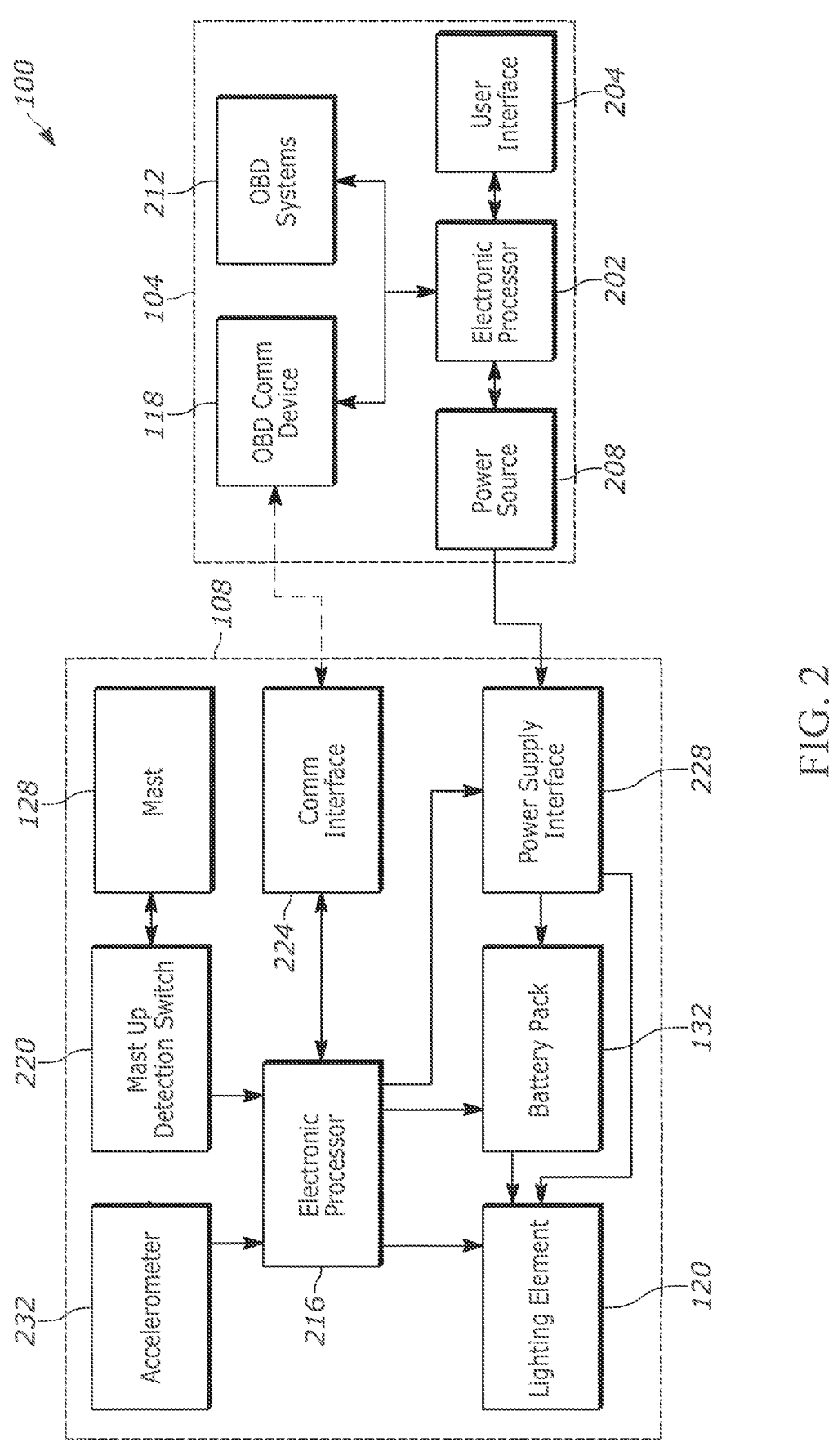
FIG. 2 illustrates a schematic block diagram of the vehicle-mounted lighting system of FIG. 1, according to some embodiments.

Referring now to the schematic block diagram of FIG. 2, the vehicle 104 may further include a first electronic processor 202 (for example, a microprocessor or other electronic device), user interface (UI) 204, a power source 208, and onboard diagnostic (OBD) systems 212. The first electronic processor 202 is electrically coupled to a plurality of electrical components of the vehicle 104, including the user interface 204, the power source 208, and the onboard diagnostic systems 212. The user interface 204 provides an indication to an operator of the vehicle 104 relating to the state of the vehicle 104 and/or the state of the lighting device 108. For example, the user interface 204 includes a suitable display mechanism for displaying the visual output, such as, for example, a liquid crystal display (LCD) touch screen, or an organic light-emitting diode (OLED) touch screen), or other suitable mechanisms. The user interface 204 may also include a speaker or other audio output device configured to provide an audible notification to an operator of the vehicle 104. The power source 208 of the vehicle 104 may include an engine or alternator of the vehicle 104 (e.g., when an engine of the vehicle is running/operational) and/or a battery of the vehicle 104.

The onboard diagnostic systems 212 include a plurality of sensors and/or electronic processors configured to provide onboard diagnostic information relating to the operational state of the vehicle 104. For example, the onboard diagnostic information may include, but is not limited to, rotations per minute ("RPM") of the vehicle engine, an RPM of the vehicle alternator, vehicle speed, vehicle acceleration, vehicle pedal position, vehicle gear shifter position, or a combination thereof. Via the communication device 118 coupled to the OBD II port of the vehicle 104, at least some of the onboard diagnostic information may be communicated to the lighting device 108. The lighting device 108 also may communicate information to the first electronic processor 202 of the vehicle 104 via the communication device 118. The first electronic processor 202 may include any one or a combination of electronic processors located within the vehicle 104. Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations.

As shown in FIG. 2, the lighting device 108 includes a second electronic processor 216 (for example, a microprocessor or other electronic device), a mast-up detection switch 220, a communication interface 224, and a power supply interface 228. In some embodiments, the lighting device 108 further includes an accelerometer 232. The second electronic processor 216 is electrically connected to the mast-up detection switch 220, the communication interface 224, the battery pack 132, the power supply interface 228, the accelerometer 232, and the lighting element 120. The second electronic processor 216 may provide operational control of the lighting device 108. The second electronic processor 216 may communicate wirelessly and bidirectionally with the communication device 118 coupled to the OBD II port of the vehicle 104 via the communication interface 224. For example, the communication interface 224 may include a wireless transceiver (e.g., a Bluetooth™ transceiver) to allow for wireless communication between the lighting device 108 and the communication device 118. The second electronic processor 216 may transmit information related to the operation and/or position of the lighting device 108 to the vehicle 104 and may receive information related to the operation of the vehicle 104, for example, onboard diagnostic information. In some embodiments, the second electronic processor 216 communicates with the vehicle 104 via a wired connection, for example, a wired connection between the communication interface 224 and the communication device 118 or the OBD II port of the vehicle 104. The second electronic processor 216 may include any one or a combination of electronic processors located within the lighting device 108 and/or configured to control the lighting device 108. Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations.

In some instances, the mast-up detection switch 220 is configured to provide a signal to the second electronic processor 216 indicative of the position of the mast 128. For example, the second electronic processor 216 determines, based on the signal output by the mast-up detection switch 220, whether the mast 128 is in an upright/extended position versus a folded/retracted position. One or more magnetic sensors may embody the mast-up detection switch 220 to allow for detection of the position of the mast 128. In response to determining that the mast 128 is in an upright position, the second electronic processor 216 communicates the detected upright position of the mast 128 to the first electronic processor 202 of the vehicle via the communication interface 224 and the communication device 118. In turn, the first electronic processor 202 may control the user interface 204 to provide a notification that the mast 128 is upright and that the vehicle 104 should not be moved until the mast 128 is lowered to the retracted position.

In some embodiments, the second electronic processor 216 determines whether the vehicle 104 is moving or stationary based on information received from the accelerometer 232, the onboard diagnostic information received via the communication interface 224, or a combination thereof. The second electronic processor 216 may also determine whether the vehicle 104 is in a parked/idle state, for example, when the engine of the vehicle 104 is operating/running but the vehicle 104 is not in motion. For example, when the lighting device 108 includes the communication interface 224 and when the communication interface 224 is able to communicate with the communication device 118 coupled to the OBD II port of the vehicle 104, status information about the vehicle 104 may be received from the vehicle 104 itself (e.g., from the onboard diagnostic systems 212 of the vehicle 104). As another example, when the lighting device 108 does not include the communication interface 224 or when the communication interface 224 is unable to communicate with vehicle 104 via the communication device 118 (e.g., because the communication device 118 is not connected to the OBD II port of the vehicle 104, because the communication device 118 is malfunctioning, because the onboard diagnostic systems 212 are not configured to provide desired information, etc.), status information about the vehicle may be determined/inferred based on information/data received from the accelerometer 232. Specifically, in some instances, information/data received from the accelerometer 232 may be indicative of vehicle vibrations while traveling or idling (or lack thereof while not traveling or idling) and may allow the second electronic processor 216 to determine an estimated operational characteristic of the vehicle 104. For example, the second electronic processor 216 may determine (e.g., infer/estimate) whether the vehicle 104 is on or off, whether the vehicle 104 is moving or stationary, an estimated speed at which the vehicle 104 is traveling, an estimated engine/alternator RPM (e.g., based on the estimated speed), and/or the like.

In some instances, a frequency of vibrations of the vehicle 104 as detected by the accelerometer 232 may be used by the second electronic processor 216 to determine one or more of the above-noted example vehicle characteristics. For example, in response to not detecting any vibrations from the accelerometer 232, the second electronic processor 216 may determine that the vehicle 104 is turned off and not moving. As another example, in response to detecting vibrations above a first amplitude and/or frequency threshold but below a second amplitude and/or frequency threshold, the second electronic processor 216 may determine that the vehicle 104 is turned on (e.g., engine/alternator operating) but is not moving and is merely idling (e.g., with the gear shifter in a parked position). As another example, in response to detecting vibrations above the second amplitude and/or frequency threshold, the second electronic processor 216 may determine that the vehicle 104 is turned on and is moving (e.g., with the gear shifter in a drive position). Continuing this example, in some instances, the second electronic processor 216 may determine an estimated speed at which the vehicle 104 is traveling, an estimated engine/alternator RPM (e.g., based on the estimated speed), and/or the like based on the detected vibrations in response to determining that the vehicle 104 is moving. As indicated by the examples above, in some instances, the second electronic processor 216 may be configured to determine/infer status and/or operational characteristics of the vehicle 104 independently from (e.g., without) communication with the OBD systems 212 of the vehicle 104. In some instances, an operational characteristic of the vehicle 104 includes an operational state of the vehicle 104, whether the vehicle 104 is on or off, whether the vehicle 104 is moving or stationary, an estimated speed at which the vehicle 104 is traveling, an estimated engine/alternator RPM (e.g., based on the estimated speed), and/or the like.

The second electronic processor 216 may determine whether the vehicle 104 is in a parked/idle state compared to a cruising/active/moving state or an off/non-operational state based on information received from the accelerometer 232, the onboard diagnostic information received via the communication interface 224, or a combination thereof. Based on a state of the vehicle 104, the second electronic processor 216 may take certain actions such as controlling charging of the battery pack 132 and/or operation of the lighting element 120 as explained in greater detail below.

The vehicle power source 208 may supply power from the vehicle 104 to the lighting device 108 via the power supply interface 228. The power supply interface 228 may be a hard-wired connection to the alternator of the vehicle 104, an electrical connection via a cigarette lighter outlet of the vehicle 104, and/or the like. The power supply interface 228 may be coupled to the battery pack 132 to provide power drawn from the vehicle power source 208 to charge the battery pack 132 (e.g., via charging circuitry). The battery pack 132 may then supply power to the lighting element 120. In some embodiments, the power supply interface 228 may additionally or alternatively provide power directly from the vehicle power source 208 to the lighting element 120 (e.g., via appropriate conditioning circuitry) as indicated in FIG. 2. In some embodiments, the power supply interface 228 may be coupled to an alternating current (AC) wall outlet to receive power from the wall outlet. The power supply interface 228 may include conditioning circuitry that may include combinations of active and passive components to regulate or control the power received from the wall outlet and/or the vehicle power source 208 prior to power being provided to one or more elements of the lighting device 108. The power supply interface 228 may include charging circuitry configured to charge the battery pack 132.

In some instances, the amount of power that the power supply interface 228 of the lighting device 108 draws from the vehicle 104 is dependent on the type of power source 208 to which the power supply interface 228 is connected. For example, when the vehicle power source 208 is an auxiliary power outlet of the vehicle (e.g., coupled to a cigarette lighter outlet), the second electronic processor 216 may control power drawn from the vehicle 104 to be low, for example, for slow/trickle charging of the battery pack 132 that is less than full/standard charging of the battery pack 132. Continuing this example, the second electronic processor 216 may additionally or alternatively operate the lighting element 120 in a reduced power mode when the power source 208 is the auxiliary power outlet. For example, the second electronic processor 216 may operate a reduced number of LEDs included in the lighting element 120 or otherwise operate the lighting element 120 at a lower brightness. On the other hand, when the vehicle power source 208 is the alternator of the vehicle 104 and the power supply interface 228 is connected to the vehicle 104 via a hardwired connection, the second electronic processor 216 may control power drawn from the vehicle 104 to be higher, for example, for charging of the battery pack in a standard charge mode or increased/rapid charge mode and/or for enabling full operation of the lighting element 120.

In some instances, the second electronic processor 216 controls an amount of power drawn by the lighting device 108 from the vehicle 104 depending on an operating state/operating characteristic of the vehicle 104 (e.g., an engine/alternator RPM, whether the vehicle 104 is in a parked/idle state or a cruising state, and/or the like). For example, in a parked/idle state (e.g., a state in which the engine is running/operational but the vehicle 104 is not in motion), the engine speed may be 600-800 revolutions per minute (RPM), and the alternator speed may be approximately 2100 RPM. In a cruising state (e.g., a state in which the engine is running/operational and the vehicle 104 is in motion), the engine speed may be 2000-3000 RPM, and the alternator speed may be approximately 7500 RPM. Because the engine/alternator speed is faster in the cruising state than in the parked/idle state (and can therefore deliver greater power to connected components), the second electronic processor 216 may control the lighting device 108 to draw more power from the engine/alternator (i.e., the vehicle power source 208) when the vehicle 104 is in the cruising state than when the vehicle 104 is in the parked/idle state. In some embodiments, the second electronic processor 216 controls the amount of power drawn by the power supply interface 228 of the lighting device 108 from the vehicle power source 208 to be proportional to the RPM of the engine or the alternator. As explained previously herein, the RPM of the alternator or engine may be determined by the second electronic processor 216 by receiving onboard diagnostic information from the vehicle 104 via the communication device 118 and/or may be estimated/inferred based on data received from sensors of the lighting device 108 such as the accelerometer 232.

The block diagram of FIG. 2 is merely an example. In some instances, the vehicle 104 and/or the lighting device 108 include additional or fewer components and/or different arrangements of components that that shown in FIG. 2. Additionally, FIG. 2 does not necessarily illustrate all communication paths that exist between illustrated components. For example, while some arrows in FIG. 2 are bidirectional arrows and some arrows are unidirectional arrows, in some instances, the components between unidirectional arrows may be able to communicate bidirectionally with each other (e.g., the second electronic processor 216 and the battery pack 132 and/or any other components). In some instances, communication paths may exist between components even though such communication paths are not shown in FIG. 2 (e.g., the UI 204 of the vehicle 104 may be coupled to the power source 208 directly in addition to being coupled to the first electronic processor 202).

Figure 3:
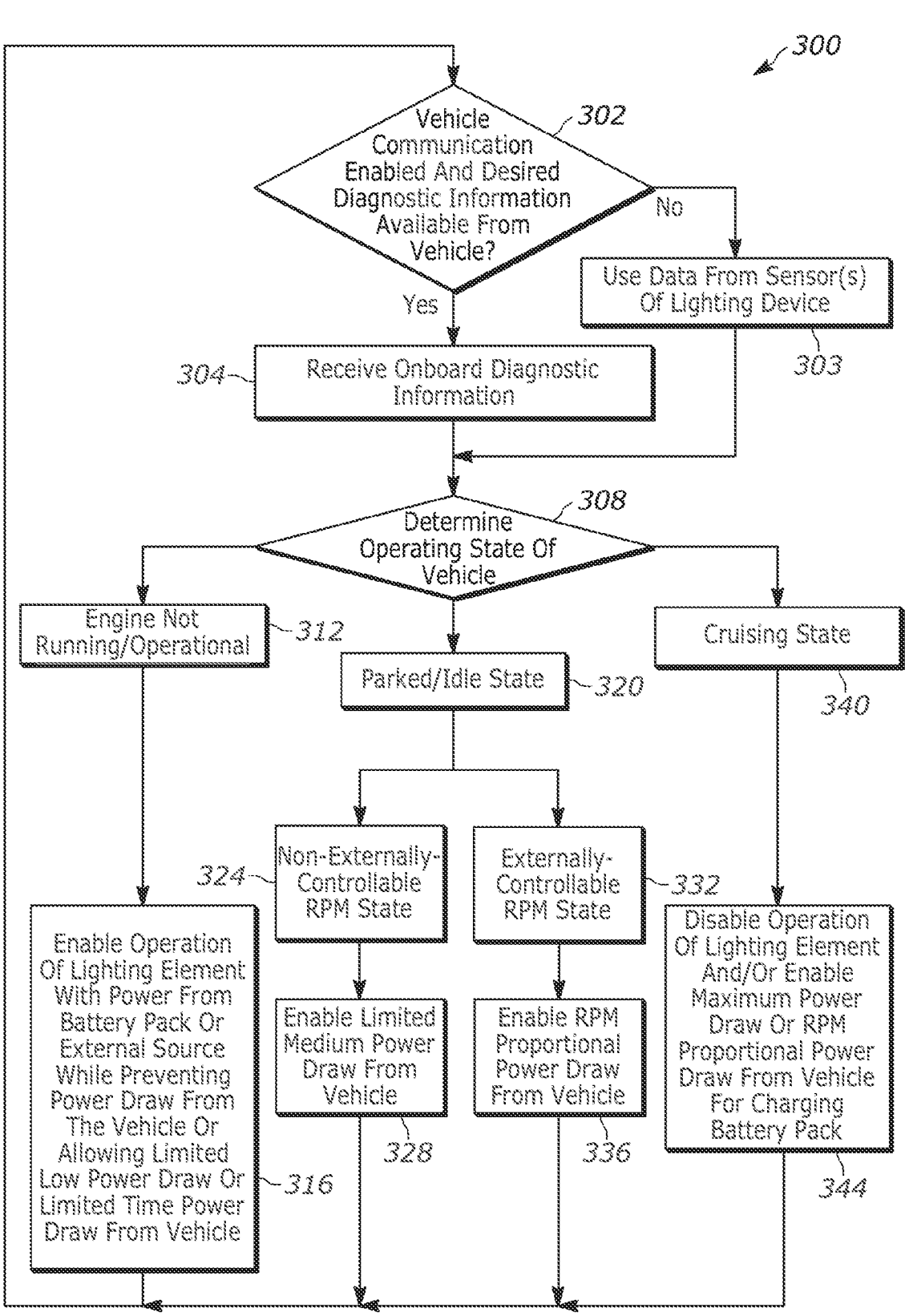
FIG. 3 illustrates a flow chart of a method for controlling the vehicle-mounted lighting system of FIG. 1, according to some embodiments.

FIG. 3 illustrates a method 300 that may be implemented by the second electronic processor 216 for controlling an operational state of the lighting device 108. In some instances, the method 300 may be implemented by the second electronic processor 216 to control whether the lighting element 120 is operational, whether the lighting device 108 draws power from the vehicle 104, and how power drawn from the vehicle 104 is used by the lighting device 108. As indicated by blocks 302, 303, and 304, each of these characteristics of the lighting device 108 may be controlled based on onboard diagnostic information received from the vehicle 104 and/or based on one or more sensors of the lighting device 108 (e.g., the accelerometer 232) that indicate an operating state of the vehicle 104.

At STEP 302, the second electronic processor 216 determines whether there is a communicative connection between the lighting device 108 and the vehicle 104 (e.g., via the communication device 118 that may be coupled to the OBD II port of the vehicle 104). At STEP 302, when there is a communicative connection between the lighting device 108 and the vehicle 104, the second electronic processor 216 may also determine whether desired diagnostic information is available from the vehicle 104. For example, desired diagnostic information may indicate a position of the gear shifter of the vehicle 104, a speed of the vehicle 104, an engine/alternator speed, another characteristic from which the engine/alternator speed may be derived/estimated, and/ or the like.

When there is not a communicative connection between the lighting device 108 and the vehicle 104 or when the desired diagnostic information is not available from the vehicle 104, the method 300 proceeds to STEP 303 to use data from a sensor(s) of the lighting device 108 (e.g., the accelerometer 232) to determine an operating state and/or an operating characteristic of the vehicle (at STEP 308).

On the other hand, when there is a communicative connection between the lighting device 108 and the vehicle 104 and when the desired diagnostic information is available from the vehicle 104, the method 300 proceeds to STEP 304. At STEP 304, the second electronic processor 216 receives, via the communication interface 224 (e.g., that may communicate with the vehicle 104 via the communication device 118), onboard diagnostic information from the vehicle 104. In some instances when STEP 304 is executed, the second electronic processor 216 may also execute STEP 303, for example, to make sure that the data received from the vehicle 104 is consistent with the data received from the sensor(s) of the lighting device 108.

At STEP 308, the second electronic processor 216 determines, based on the onboard diagnostic information and/or based on information from one or more sensors of the lighting device 108 (e.g., the accelerometer 232), an operating state of the vehicle 104.

In some instances, the operating states of the vehicle 104 include a non-operational state in which the engine is not running/operational. In the non-operational state, the vehicle 104 may be parked and turned off.

The operating states of the vehicle 104 may also include a parked/idle state in which the engine of the vehicle 104 is running/operational but the vehicle 104 is not in motion. The parked/idle state may have two or more sub-states. For example, a first substate of the parked/idle state may be a non-externally-controllable RPM state where the vehicle 104 does not allow an external device (e.g., the lighting device 108 and/or the communication device 118) to control an engine/alternator speed by sending a speed command/ request (e.g., including vehicle codes or digital communication via the OBD II port of the vehicle 104). In some instances of the non-externally-controllable RPM state, the gear shifter of the vehicle 104 is in a position besides the parked position (e.g., a drive position, a reverse position, a neutral position, and/or the like) even though the vehicle 104 is not currently moving. The vehicle 104 may be in the non-externally-controllable RPM state when the vehicle 104 is being driven on a road but is stopped at a stop light with the driver's foot actuating a brake pedal. In some instances, the non-externally-controllable RPM sub-state state may also be referred to as a drivable idle state because the vehicle 104 is capable of moving without the gear shifter being moved. In some instances, the vehicle 104 may be in the non-externally-controllable RPM state even when the gear shifter is in the parked position, for example, when the OBD systems 212 of the vehicle 104 determine that an external device (e.g., the lighting device 108 and/or the communication device 118) cannot control an engine/alternator speed by sending a speed command/request for reasons besides/ independent of the position of the gear shifter (e.g., due to an error/malfunction determination). In some instances of the non-externally-controllable RPM state, the lighting device 108 is not communicatively coupled to the vehicle 104.

As another example, a second sub-state of the parked/idle state may be an externally-controllable RPM state where the vehicle 104 allows an external device (e.g., the lighting device 108 and/or the communication device 118) to control an engine/alternator speed by sending a speed command/ request. In some instances of the externally-controllable RPM state, the vehicle 104 may be in a parked/idle state when a gear shifter of the vehicle 104 is in a parked position (e.g., when the vehicle 104 is parked in a parking lot, at a work site, etc. and is not able to move until the gear shifter is shifted to a different position).

The operating states of the vehicle 104 may also include a cruising state in which the engine of the vehicle 104 is running/operational and the vehicle 104 is in motion. For example, the vehicle 104 is in the cruising state when the vehicle 104 is being driven on a road and is moving.

At STEP 312, the second electronic processor 216 determines that the sensed/received information indicates that the engine of the vehicle 104 is not running/operational. Accordingly, at STEP 316, the second electronic processor 216 enables operation of the lighting element 120 with power from the battery pack 132 or power from an external source (e.g., a wall outlet). In some instances, at STEP 316, the second electronic processor 216 prevents power from being drawn by the lighting device 108 from the vehicle 104. In some instances, the second electronic processor 216 allows a limited low power draw (e.g., below a predetermined low power threshold) from the vehicle 104 and/or allows a limited time power draw from the vehicle 104 (e.g., for powering the lighting element 120 and/or for charging the battery pack 132). For example, such limited low power draw and/or limited time power draw may involve drawing power from the battery of the vehicle 104 even though the engine/alternator of the vehicle 104 is not running/operational. In some instances, enabling operation of the lighting element 120 allows a user to turn on the lighting element 120 using a separate switch located on the base 124 or other housing of the lighting device 108 and/or using an external device (e.g., smart phone) that sends a command to the lighting device 108. As indicated in FIG. 3, after execution of the STEP 316, the method 300 proceeds back to STEP 302 to continuously or periodically receive/sense additional information about the vehicle 104 and repeat the method 300.

At STEP 320, the second electronic processor 216 determines that the sensed/received information indicates that the vehicle 104 is in the parked/idle state. In some instances, the second electronic processor 216 may further determine a sub-state of the parked/idle state in order to control the lighting device 108 based on the sub-state of the parked/idle state. For example, at STEP 324, the second electronic processor 216 determines that the sensed/received information indicates that the vehicle 104 is in the non-externallycontrollable RPM state. Accordingly, at STEP 328, the second electronic processor 216 enables a limited medium power draw from the vehicle 104 by the lighting device (e.g., for charging the battery pack 132). In some instances, the limited medium power draw is below a predetermined medium power threshold that is higher than the low power threshold described previously herein with respect to STEP 316. The limited medium power draw may be higher than the optional limited low power draw of STEP 316 because the vehicle 104 may be capable of generating and providing more power in the parked/idle state when the engine/alternator is operating than in the non-operational state in which the engine/alternating is not operating. In some instances, at STEP 328, the second electronic processor 216 enables power to be drawn from the vehicle 104 in an amount that is proportional to the speed (e.g., RPM) of the engine/alternator until the power drawn reaches the medium power threshold, at which point the power drawn may remain at an amount corresponding to the medium power threshold. In some instances, at STEP 328, the second electronic processor 216 controls the power supply interface 228 of the lighting device 108 to draw power from the vehicle 104 that is sufficient for slow/trickle charging of the battery pack 132. In some instances, at STEP 328, the second electronic processor 216 disables operation of the lighting element 120 since the vehicle 104 is capable of moving at any moment without the gear shifter changing positions.

At STEP 332, the second electronic processor 216 determines that the sensed/received information indicates that the vehicle 104 is in the externally-controllable RPM state. Accordingly, at STEP 336, the second electronic processor 216 enables an RPM proportional power draw from the vehicle 104 by the lighting device 108, for example, for charging the battery pack 132 and/or powering the lighting element 120. In some instances, the RPM proportional power draw may not be limited by the medium power threshold described above with respect to block 328. For example, because the lighting device 108 can provide a speed/RPM command/request to the vehicle 104 in the externally-controllable RPM state where the vehicle 104 is not moving, the second electronic processor 216 may allow the lighting device 108 to draw more power from the vehicle 104 in accordance with the requested speed/RPM of the engine/alternator of the vehicle 104. In some instances, at STEP 336, the second electronic processor 216 enables operation of the lighting element 120 since the vehicle 104 is not capable of moving without the gear shifter changing positions. In some instances, the power drawn by the lighting device 108 may power the lighting element 120 and/or may be used to charge the battery pack 132.

In some instances, enabling power to be drawn by the lighting device 108 from the vehicle 104 includes closing a switch (e.g., a field effect transistor (FET)) that may allow current to flow from the power source 208 of the vehicle 104 (e.g., the engine/alternator) to the lighting device 108. In some instances, enabling power to be drawn by the lighting device 108 does not necessarily include a constant or continuous power draw from the vehicle 104 and may instead include power being periodically drawn and/or drawn at some times but not at other times. In some instances, in response to determining that the vehicle 104 is in the non-externally-controllable RPM state, the second electronic processor 216 controls the power supply interface 228 of the lighting device 108 to draw power from the vehicle 104 that is sufficient for standard charging of the battery pack 132 because the engine is running/operational.

As indicated in FIG. 3, after execution of the STEPS 328 or 336, the method 300 proceeds back to STEP 302 to continuously or periodically sense/receive additional information from the vehicle 104 and repeat the method 300.

At STEP 340, the second electronic processor 216 determines that the sensed/received information indicates that the vehicle 104 is in the cruising state. Accordingly, at STEP 344, the second electronic processor 216 disables/inhibits operation of the lighting element 120 and/or enables maximum power draw (e.g., up to a predetermined maximum power threshold that is higher than the other power thresholds described previously herein) or RPM proportional power draw (e.g., up to the maximum power draw threshold) from the vehicle 104. For example, such power draw may be used for charging the battery pack 132 of the lighting device 108 while the vehicle 104 is driving/moving. In some instances, disabling operation of the lighting element 120 includes opening a switch (e.g., a FET) such that the lighting element 120 does not illuminate even if the separate switch located on the base 124 or other housing of the lighting device 108 is actuated to be in an "ON" position or even if a command to turn on the lighting element 120 is received from an external device. In some instances, in response to determining that the vehicle 104 is in the cruising state, the second electronic processor 216 controls the power supply interface 228 of the lighting device 108 to draw power from the vehicle 104 that is sufficient for standard charging or increased/rapid charging of the battery pack 132 because the engine is running/operational. In some instances, the second electronic processor 216 controls a charging current drawn from the power source 208 of the vehicle 104 to be approximately proportional to the RPM of the engine or alternator of the vehicle 104. For example, the charging current may increase as the RPM of the engine or alternator increases. As indicated in FIG. 3, after execution of the STEP 344, the method 300 proceeds back to STEP 304 to continuously or periodically receive additional onboard diagnostic information from the vehicle 104 and/or sensed information from the accelerometer 232 and repeat the method 300.

In some instances, the second electronic processor 216 controls the current (e.g., charging current and/or current drawn to power the lighting element 120) drawn from the power source 208 of the vehicle 104 based on whether the speed/RPM of the engine or alternator is above a predetermined RPM threshold. For example, when the RPM of the engine or alternator is below the predetermined RPM threshold (e.g., when the vehicle 104 is in the parked/idle state), the second electronic processor 216 may control the current to be below a predetermined current threshold, for example, such that the battery pack 132 may only receive a slow/trickle charging current that is less than full/standard charging current and/or such that the lighting element 120 functions at less than a maximum brightness. Continuing this example, when the RPM of the engine or alternator is at or above the predetermined RPM threshold, the second electronic processor 216 may control the current to be at or above the predetermined current threshold, for example, such that the battery pack 132 may receive a full standard charging current and/or such that the lighting element 120 functions at a maximum brightness. Such control of the charging current drawn by the power supply interface 228 for charging the battery pack 132 may be implemented when the vehicle 104 is in the parked/idle state (including either of its sub-states) and the cruising state. Such control of the current drawn by the power supply interface 228 for powering the lighting element 120 may be implemented when the vehicle 104 is in the externally-controllable RPM state and/or in other operating states of the vehicle 104. As indicated by the above explanation and examples, in some instances, the power able to be provided by the vehicle 104 to various components of the lighting device 108 (lighting element 120, battery pack 132, etc.) is directly related to engine/alternator speed/RPM. As the engine RPM increases, the engine/alternator is able to deliver greater power to connected components. Accordingly, the second electronic processor 216 may control the lighting device 108 to draw different amounts of power/current up to different threshold values (e.g., predetermined threshold values) depending on the operating state and/or an operating characteristic of the vehicle 104 as indicated in FIG. 3.

As explained previously herein, in some instances, the second electronic processor 216 is configured to generate a RPM command that indicates a desired RPM for the engine or alternator of the vehicle 104 based on a desired current to be drawn by the lighting device 108 for powering the lighting element 120, for charging the battery pack 132, or for both powering the lighting element 120 and for charging the battery pack 132. The second electronic processor 216 may be configured to transmit the RPM command, via the communication interface 224 and the communication device 118, to the first electronic processor 202 of the vehicle 104. The first electronic processor 202 may be configured to control the engine or alternator to operate according to the RPM command. The second electronic processor 216 may be configured to control an amount of power drawn by the power supply interface 228 of the lighting device 108 from the power source 208 of the vehicle 104 in response to transmitting the RPM command to the vehicle 104. For example, the lighting device 108 may transmit the RPM command and the vehicle 104 may control the engine or alternator in accordance with the RPM command when the vehicle 104 is in the externally-controllable RPM state to allow the engine/alternator to provide variable/different power to the lighting device 108 in accordance with desired functionality of the lighting device 108. For example, an operator of the vehicle 104 may park the vehicle 104 at a work site and desire to use the vehicle 104 as a generator/ power source to provide power to the lighting device 108 for extended periods of time (e.g., multiple hours).

In some instances, charging current of the battery pack 132 and/or brightness of the lighting element 120 are controlled to balance charge time and/or run time with battery pack capacity and/or vehicle engine/alternator RPM.

What is claimed is:

1. A lighting system comprising:
   a lighting device mountable to a vehicle, wherein the lighting device includes a lighting element configured to illuminate an area;
   a battery pack configured to provide power to the lighting device;
   a power supply interface configured to receive power from a power source of the vehicle and configured to provide power to the battery pack, the lighting device, or both the battery pack and the lighting device, wherein the power supply interface includes charging circuitry configured to charge the battery pack;
   a communication interface configured to communicate with a first electronic processor of the vehicle; and
   a second electronic processor configured to:
      receive, via the communication interface, onboard diagnostic information from the first electronic processor of the vehicle, wherein the onboard diagnostic information includes at least one of a group of rotations per minute ("RPM") of an engine of the vehicle, a speed of the vehicle, an acceleration of the vehicle, a position of a gear shifter of the vehicle, a pedal position of the vehicle, or combinations thereof; and
      control, based on the onboard diagnostic information, an amount of power drawn by the power supply interface from the power source of the vehicle by:
         determining whether the vehicle is moving based on the onboard diagnostic information,
         inhibiting power from being supplied to the lighting element in response to determining that the vehicle is moving, and
         controlling the power supply interface to charge the battery pack in response to determining that the vehicle is moving such that the amount of power drawn by the power supply interface to charge the battery pack is proportional to the RPM of the engine of the vehicle until the power drawn reaches a predetermined threshold;
   wherein the power source of the vehicle is an alternator of the vehicle.

2. The lighting system of claim 1, wherein the lighting device further comprises a mast coupled to the lighting element, wherein the mast is configured to be moved between a retracted position and an extended position; and
   wherein the second electronic processor is configured to
      determine a position of the mast, and
      transmit, via the communication interface, information associated with the
   position of the mast to the first electronic processor of the vehicle.

3. The lighting system of claim 1, wherein the second electronic processor is configured to:
   generate a RPM command;
   transmit, via the communication interface, the RPM command to the first electronic processor of the vehicle, wherein the first electronic processor is configured to control the engine to operate according to the RPM command; and
   control the amount of power drawn by the power supply interface from the power source of the vehicle in response to transmitting the RPM command.

4. The lighting system of claim 1, wherein the onboard diagnostic information includes at least one of a speed of the vehicle, an acceleration of the vehicle, or a pedal position of the vehicle; and
   wherein the second electronic processor is configured to
      determine whether the vehicle is moving based on the onboard diagnostic information, and
      enable power to be supplied to the lighting element in response to determining that the vehicle is not moving.

5. The lighting system of claim 1, wherein the communication interface includes a wireless communication interface.

6. A method of controlling a lighting system, the method comprising:
   receiving, with a power supply interface of the lighting system, power from a power source of a vehicle to which a lighting device of the lighting system is mounted, the lighting device including a lighting element configured to illuminate an area, wherein the power source of the vehicle includes an alternator of the vehicle;
   providing, with the power supply interface, power to the lighting device, a battery pack of the lighting system, or both the lighting device and the battery pack, the battery pack being configured to provide power to the lighting device;

receiving, with a second electronic processor of the lighting system via a communication interface of the lighting system, onboard diagnostic information from a first electronic processor of the vehicle; and controlling, with the second electronic processor and based on the onboard diagnostic information, an amount of power drawn by the power supply interface from the power source of the vehicle;

wherein the power supply interface includes charging circuitry configured to charge the battery pack;

wherein the onboard diagnostic information includes at least one of a group of rotations per minute ("RPM") of an engine of the vehicle, a speed of the vehicle, an acceleration of the vehicle, a position of a gear shifter of the vehicle, a pedal position of the vehicle, or combinations thereof; and wherein the method further comprises:

determining, with the second electronic processor and based on the onboard diagnostic information, whether the vehicle is moving inhibiting, with the second electronic processor, power from being supplied to the lighting element in response to determining that the vehicle is moving, and controlling, with the second electronic processor, the power supply interface to charge the battery pack in response to determining that the vehicle is moving such that the amount of power drawn by the power supply interface to charge the battery pack is proportional to the RPM of the engine of the vehicle until the power drawn reaches a predetermined threshold.

7. The method of claim 6, further comprising:

determining, with the second electronic processor, a position of a mast coupled to the lighting element, the mast being configured to be moved between a retracted position and an extended position; and transmitting, with the second electronic processor via the communication interface, information associated with the position of the mast to the first electronic processor of the vehicle.

8. The method of claim 6, further comprising:

generating, with the second electronic processor, a RPM command;

transmitting, with the second electronic processor via the communication interface, the RPM command to the first electronic processor of the vehicle, wherein the first electronic processor is configured to control the engine to operate according to the RPM command; and controlling, with the second electronic processor, the amount of power drawn by the power supply interface from the power source of the vehicle in response to transmitting the RPM command.

9. The method of claim 6, wherein the onboard diagnostic information includes at least one of a speed of the vehicle, an acceleration of the vehicle, or a pedal position of the vehicle, and further comprising:

determining, with the second electronic processor and based on the onboard diagnostic information, whether the vehicle is moving; and enabling, with the second electronic processor, power to be supplied to the lighting element in response to determining that the vehicle is not moving.

10. The method of claim 6, wherein the communication interface includes a wireless communication interface.

11. A lighting system comprising:

a lighting device mountable to a vehicle, wherein the lighting device includes a lighting element configured to illuminate an area;

a battery pack configured to provide power to the lighting device;

a power supply interface configured to receive power from a power source of the vehicle and configured to provide power to the battery pack, the lighting device, or both the battery pack and the lighting device, wherein the power supply interface includes charging circuitry configured to charge the battery pack;

a communication interface configured to communicate with a first electronic processor of the vehicle; and a second electronic processor configured to;

receive, via the communication interface, onboard diagnostic information from the first electronic processor of the vehicle, wherein the onboard diagnostic information includes at least one of a group of rotations per minute ("RPM") of an engine of the vehicle, a speed of the vehicle, an acceleration of the vehicle, a position of a gear shifter of the vehicle, a pedal position of the vehicle, or combinations thereof, determine an operational characteristic of the vehicle, and control, based on the operational characteristic, an amount of power drawn by the power supply interface from the power source of the vehicle by:

determining whether the vehicle is moving based on the operational characteristic of the vehicle, inhibiting power from being supplied to the lighting element in response to determining that the vehicle is moving, and controlling the power supply interface to charge the battery pack in response to determining that the vehicle is moving such that the amount of power drawn by the power supply interface to charge the battery pack is proportional to the RPM of the engine of the vehicle until the power drawn reaches a predetermined threshold.

12. The lighting system of claim 11, further comprising a sensor coupled to the second electronic processor, wherein the second electronic processor is configured to determine the operational characteristic of the vehicle by determining an estimated operational characteristic of the vehicle based on data received from the sensor.

13. The lighting system of claim 12, wherein the sensor includes an accelerometer.

14. The lighting system of claim 11, wherein the second electronic processor is configured to:

determine the operational characteristic of the vehicle based on the onboard diagnostic information.

* * * * *